United States Patent

[11] 3,534,725

[72] Inventors Orvis A. Davis, Sr., Gibsonia and
William E. Kramer, Pittsburgh, Pennsylvania
[21] Appl. No. 774,859
[22] Filed Nov. 12, 1968
[45] Patented Oct. 20, 1970
[73] Assignee Gulf Research & Development Company
Pittsburgh, Pennsylvania
a corporation of Delaware

[54] OIL-FIRED WEEVIL CONTROL BURNER
16 Claims, 8 Drawing Figs.
[52] U.S. Cl. ............................................. 126/271.2, 431/353
[51] Int. Cl. ............................................. A01m 15/00, F23c 5/00
[50] Field of Search ............................................. 126/271.2, 271.2(A), 271.2(C); 431/187, 265, 350, 353

[56] References Cited
UNITED STATES PATENTS
| | | | |
|---|---|---|---|
| 517,191 | 3/1894 | Perkins | 126/271.2A |
| 1,500,340 | 7/1924 | Smith | 126/271.2A |
| 1,581,406 | 4/1926 | Stebbins | 126/271.2A |
| 3,160,154 | 12/1964 | Sowell | 126/271.2A |
| 3,362,397 | 1/1968 | Murphy | 126/271.2A |
| 3,404,676 | 10/1968 | Walker et al. | 126/271.2C |

Primary Examiner—Charles J. Myhre
Attorneys—Meyer Neishloss, Deane E. Keith and William Kovensky ABSTRACT: A flame cultivator adapted to be supported on and moved by a farm tractor comprising a hover and manifold assembly, with a dual purpose tank to supply primary air and pressurized fuel to nozzles carried on the manifold, and means to supply secondary air around the nozzles to support combustion and create a high temperature under the hover.

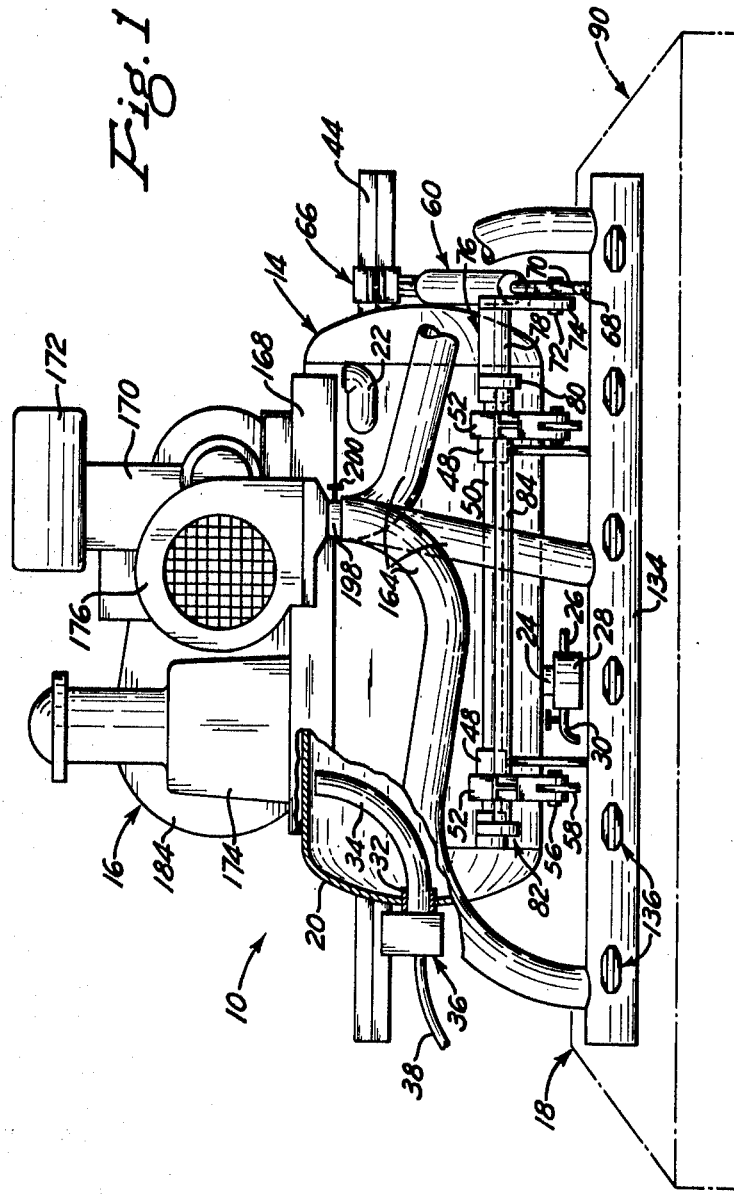

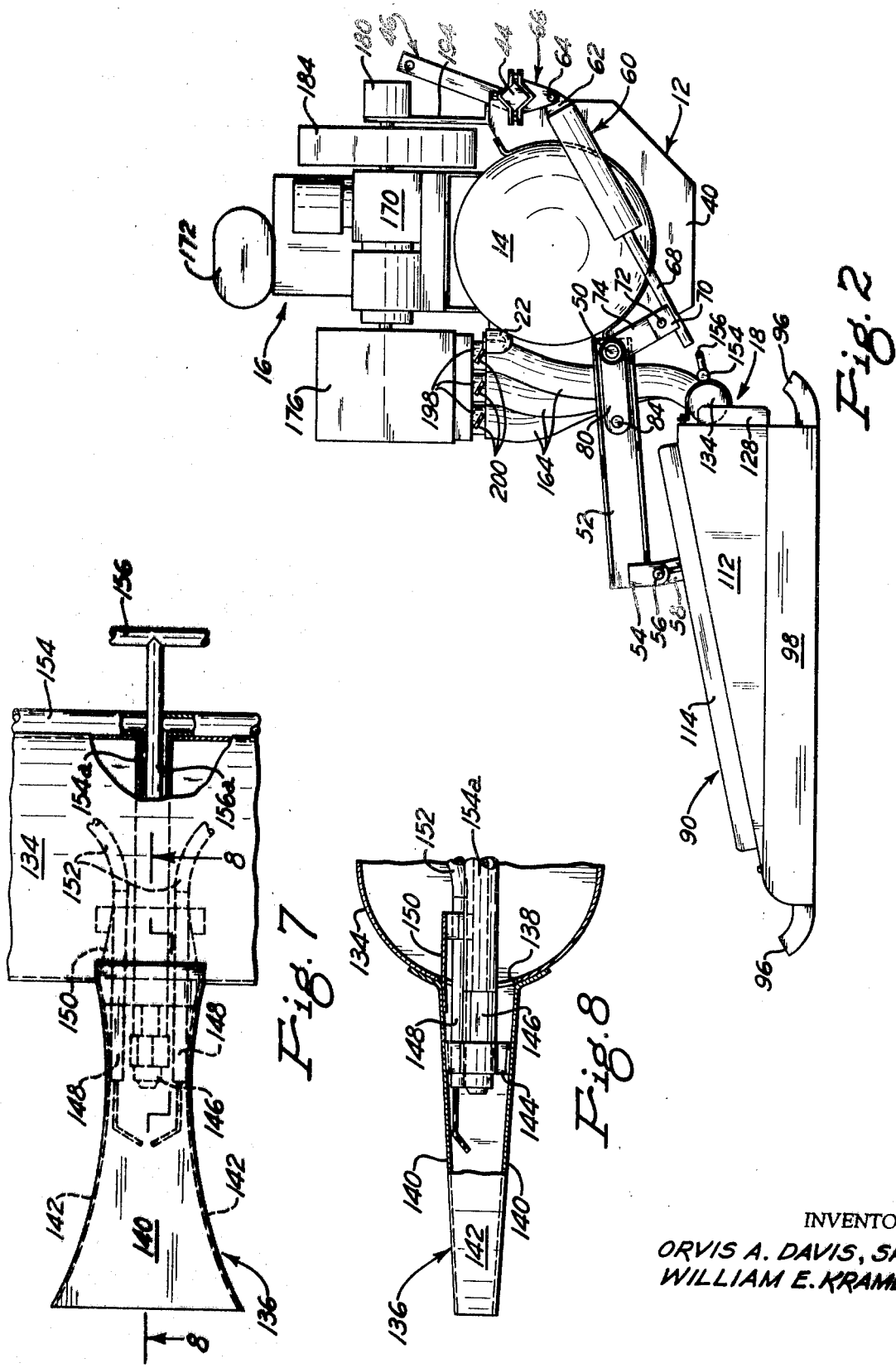

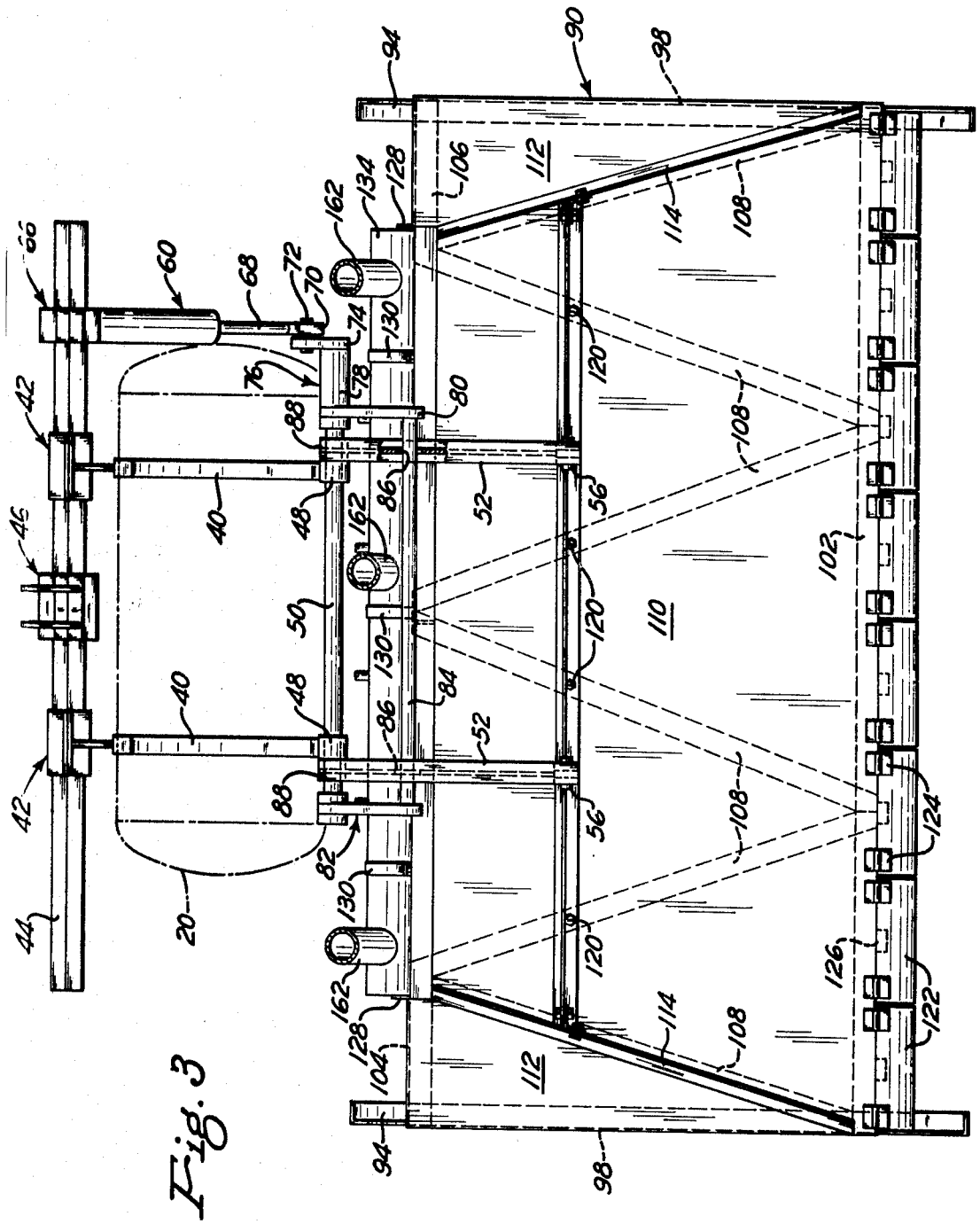

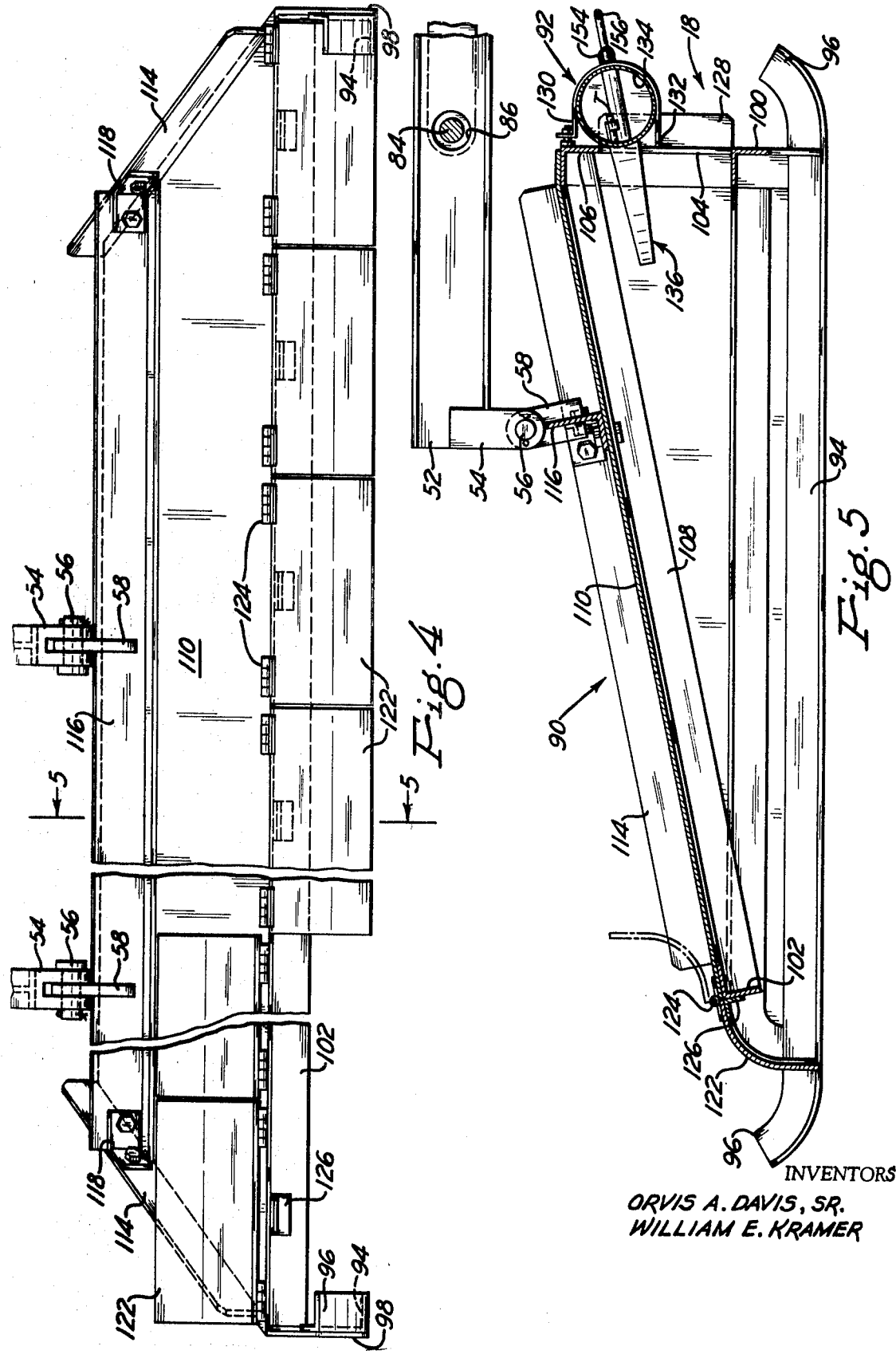

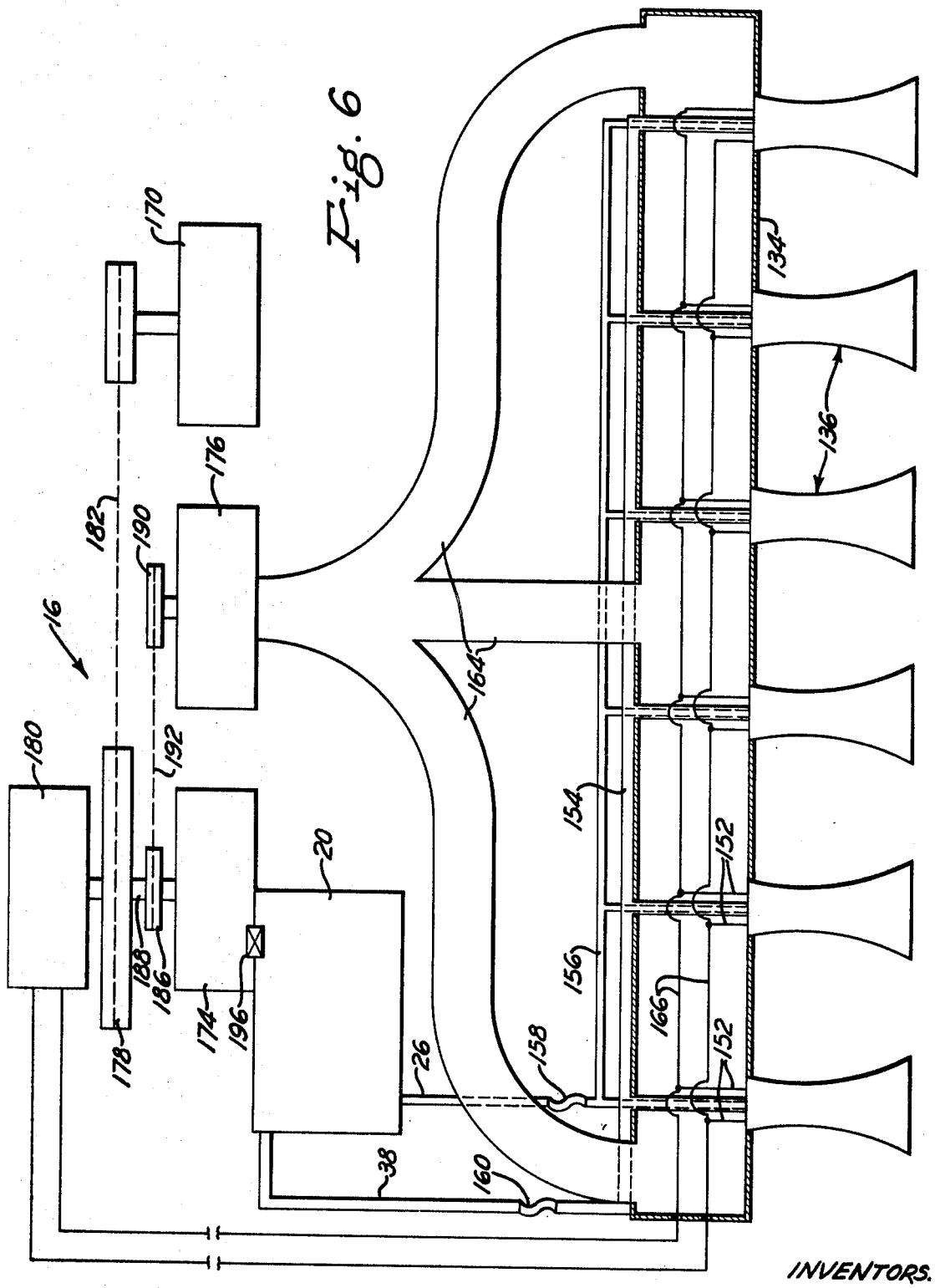

OIL-FIRED WEEVIL CONTROL BURNER

This invention pertains to control of certain pests and weeds in the cultivation of commercial crops. More in particular, the invention concerns a flame cultivator wherein heat and flame are used to eliminate certain pests and weeds. Still more particularly, the invention pertains to a flame cultivator for use in exterminating a particular weevil that infects alfalfa.

Alfalfa is an important grasslike crop widely grown for hay and forage. Once a field is established and regularly fertilized, a crop may be cut two or three times a year, and the remaining stubble will grow back without further planting. The alfalfa weevil lays its eggs in the cut stubble above the ground after the alfalfa has been harvested. If not controlled, this pest will destroy the plants and the field. Research has shown that heat will destroy the weevil eggs, exposure to temperatures of at least 150°F. for as short a time as one/tenth of a second have proven effective in this task.

An important consideration, from the farmers' or users' viewpoint, is the cost of flame cultivation. It is therefore important that the weevil eggs be destroyed at a total cost, including fuel, equipment rental, labor, and the like, which is as low as possible. The present invention provides a flame cultivator which may be moved by conventional farm tractors at a relatively high speed through a field to minimize total cost. The invention provides apparatus for the effective burning of fuel and means to contain the flame in a relatively small region to produce a relatively high temperature in said region which may be moved rapidly to thereby minimize the fuel cost.

The invention utilizes a special nozzle which produces a flat flame, and which is adapted to effectively burn many different kinds of liquid fuel, to thereby lend versatility, as to fuel selection, to the user or farmer.

The invention comprises a self-contained flame cultivator adapted to burn a wide variety of fuels, and adapted for controlling many different types of pests and weeds. The apparatus comprises a structural assembly which cradles a tank. The tank serves as both a fuel reservoir and a surge tank for air supplied by a compressor to the top portion of the tank. Thus, the pressurized air serves to both drive the fuel and as a receiver and sump for air for use in the nozzles as primary air. Mounted on the tank is a power group including a prime mover which may be an electric or hydraulic motor, in addition to the preferred internal combustion engine. The power group also includes an air compressor, a magneto or other source of electrical energy for ignition purposes, and a low pressure, high volume air blower to supply secondary air to the nozzles under the hover.

The structural assembly also includes means to mount a hover and manifold assembly. This assembly includes a plurality of the nozzles and an equal number of flame spreaders, and means to contain the flame produced in the relatively small region under the hover to produce a high temperature therein to permit rapid cultivation. Means are also provided on the structural assembly to permit attachment of the self-contained flame cultivator of the invention to a conventional three-point hitch on farm tractors, and means to connect the hover raising apparatus, which includes a hydraulic cylinder, to the utility hydraulic outlet on such tractors.

The above and other advantages of the invention will be pointed out or will become evident in the following detailed description and claims, and in the accompanying drawing also forming a part of the disclosure, in which:

FIG. 1 is a rear elevational view of the flame cultivator of the invention with some parts broken away and in cross section, and other parts indicated diagrammatically;

FIG. 2 is a side elevational view thereof;

FIG. 3 is a top plan view particularly showing the hover;

FIG. 4 is a rear elevational view of the hover;

FIG. 5 is a cross-sectional view taken on line 5–5 of FIG. 4;

FIG. 6 is a somewhat diagrammatic view showing the interaction of the manifold and the power group, and the power train in the power group;

FIG. 7 is a plan view of a portion of the manifold showing a flame spreader and nozzle; and FIG. 8 is a cross-sectional view taken on line 8–8 of FIG. 7.

Referring now in detail to the drawing, 10 designates a preferred embodiment of the flame cultivator of the invention. For ease of description, the apparatus has been divided into several portions, and each portion will be described individually, as far as possible. Referring to FIGS. 1 and 2, the apparatus comprises a structural portion 12 which carries a tank assembly 14. Mounted on tank assembly 14 are a group of components which supply fuel, air, and electricity, and which shall be designated as the power group 16 herein. At the rear end of structural assembly 12 is a hover and manifold assembly 18. For reference purposes, looking at FIG. 2, the right side shall be designated the front end of the apparatus, and the left side shall be designated the rear end, because in use a tractor would pull the apparatus of the invention from left to right.

Tank assembly 14 comprises a pressure vessel 20. In the successfully built embodiment of the invention, pressure vessel 20 comprises a steel compressed air tank of 60 gallon capacity, manufactured by the De Vilbiss Company of Toledo, Ohio. Vessel 20 comprises an integral fill pipe 22, and an outlet 24 at the bottom. A fuel supply line 26, which feeds the fuel under pressure from vessel 20 to the nozzles, extends from outlet 24 via a shut off valve and fuel filter device 28. Outlet 24 extends a short way into the tank to prevent entry of sediment. A manually operated drain valve 30 is provided for cleaning and the like purposes, and has direct access to outlet 24. On one end wall vessel 20 is provided with a threaded nipple 32 which carries an air snorkel tube 34, which extends into the vessel. Tube 34 curves upwardly and terminates closely adjacent the top or highest portion of the vessel when the apparatus is in use. The function of air snorkel tube 34 will be explained in more detail below. At its outer end tube 34 carries an outlet manifold and instrument group 36 which includes a manually operated main outlet valve which controls and regulates the flow of pressurized air through a line 38 which feeds the nozzles with primary air, as will be described in more detail below. Group 36 also includes a safety relief valve which will unload the pressure in the tank when it exceeds design pressure. A pressure gauge is also provided in group 36 so that the pressure of the fuel flowing through line 26 to the nozzles can be known. Group 36 also includes an adjustable automatic unloader, which is a fairly standard pneumatic component. By adjustment of this unloader, the compressor, which operates continuously, is permitted to maintain only the predetermined pressure set on the unloader in the usual manner. A pneumatic check valve is provided between the tank and the compressor at the discharge of the compressor and acts to seal the tank to permit no load starting of the compressor. A standard pneumatic outlet manifold, not shown, is also provided on the tank. Thus, the fuel may be supplied at tank pressure and the air at a lower, regulated pressure.

Vessel 20 is mounted on a pair of cradle members 40 forming part of structural portion 12. At their rear ends, each cradle member 40 carries a bar holder assembly 42, in which is removably and adjustably mounted a square cross section bar 44. Removably and adjustably mounted on bar 44 is a hitch member 46, which provides the upper connection point of the standard 3-point farm hitch. The other two hitch members, not shown, are connected to bar 44, whereby the cultivator 10 of the invention is adapted to be attached to a farm tractor with the weight of the apparatus of the invention supported by the tractor via the three hitch members on bar 44, in the conventional manner.

At its front end, each cradle member 40 carries a bearing 48, which bearings rotatably mount a hover mounting shaft 50. Rotatably mounted on hover mounting shaft 50, closely adjacent the bearings 48, are the rear ends of a pair of hover lift arms 52. The arms 52 carry the hover and manifold assembly 18 at their rear ends, by means of tabs 54 and pin connections 56 which cooperate with mating tabs 58 on the hover.

Means are provided to lift the hover with respect to the cradle 40 about hover mounting shaft 50, while simultaneously providing means to accommodate minor motions of the hover induced in it by its passage across a field when it is in the down or operating position without disturbing the hover lifting means. To this end, a pneumatic cylinder 60 is provided and has its end anchor tab 62 rotatably mounted by means of a pin 64 to an anchor assembly 66 mounted on square bar 44. The operating shaft 68 of cylinder 60 carries a tab 70 rigidly fixed thereto as by welding or other suitable means, and a pin 72 provides a rotatable connection between tab 70 and the outer end of one arm 74 of a bell crank assembly 76. As is known, cylinder 60 comprises intake and exhaust valves, and a supply hose, all not shown. The cylinder hose may be connected to the utility pneumatic outlet of the tractor with which the cultivator of the invention is being used, whereby the operator may raise and lower the hover from the tractor seat during operation. Bell crank 76 comprises a cylindrical hub portion 78 which encircles and is fixed to hover mounting shaft 50. At its other end, hub 78 mounts a second bell crank arm 80. At its other end shaft 50 carries a crank arm 82 fixedly mounted thereon. A lift shaft 84 interconnects the outer ends of the two crank arms 80 and 82. Hover lift arms 52 are of "I" beam configuration, and the web of each arm is formed with an enlarged opening 86 which receives the lift shaft 84 but is of a diameter substantially larger than the diameter of said lift shaft. The rear ends of the arms 52 are formed with hub portions 88 which closely but loosely encircle the mounting shaft 50. Thus, when the hover and manifold assembly 18 is in use and encounters an obstacle such as a mound or a rock or the like, it may move freely, about shaft 50 on hubs 88, within the limits defined by the oversized openings 86 without effecting arms 80 and 82 and the cylinder 60.

Referring now to FIGS. 3, 4, and 5, hover and manifold assembly 18 comprises a hover 90 and a manifold 92. Hover 90 serves to contain the heat produced from the combustion of the fuel to provide a relatively small region of relatively high temperature whereby a field may be rapidly flame cultivated. Generally, the hover is rectangular in plan view and triangular in cross-sectional elevation, with the sides tapering slightly upwardly. As an indication of orders of magnitude and not as a limitation, in the successfully constructed embodiment of the invention used to flame cultivate alfalfa, the overall outside dimensions of the hover are about 8 feet wide, 4 feet long, 14 inches high at the highest part, and 5 inches high to the top of the skirts at the trailing end, described below. The construction is, basically, an angle iron weldment with a sheet metal skin.

The hover moves through the field on a pair of side skids 94 having curved front and rear ends 96. As described above, the lifting mechanism including cylinder 60 and bell crank 76 allow the entire weight of the hover to rest on the skids when the apparatus is in use, and the hover's own weight, with the manifold, is sufficient to keep it in close contact with the ground. The curved portions 96 prevent the hover from catching or hanging up on obstacles in the field. Along the outside of each skid 94, the hover comprises a side supporting plate 98 which is welded at its bottom end to the side flange of each skid. The upper front and rear ends of the side plates are interconnected by front and rear cross member angle irons 100 and 102, respectively. Joined to the upper end of front cross piece 100 is a manifold mounting plate 104 which carries an upper front cross piece angle iron 106. Rear cross piece 102 and upper front cross piece 106 are interconnected by six angularly disposed bracing piece angle irons 108. Top skin member 110 of sheet metal covers the bracing pieces 108, and a pair of triangularly shaped sheet metal skin members 112 close off the area between the top of side supporting plates 98 and outermost two bracing pieces 108, respectively.

To provide a strong connection from which to lift the hover 90 and to spread the weight of the hover when it is being lifted throughout the framework, a pair of side external bracing members 114 are provided coextensive with the two outermost bracing members 108 and joined thereto and to the skin 110 by any suitable means such as welding, nuts and bolts, or the like. Another external cross piece 116 is joined at its ends by bracket members 118 to the bracing members 114 by nuts and bolts, welding, or other suitable means. Along its length, cross piece 116 is joined to the intermediate bracing pieces 108 through skin member 110 by nuts and bolts 120. The tabs 58 described below are joined to the cross piece 116 to thereby provide the connection between the hover and the hover lifting means.

Means are provided to close the rear trailing end of the hover from the level of rear cross piece 102 to the ground. To this end, a plurality of arcuate skirts 122 are provided, each having its upper end joined to rear cross piece 102 by a hinge 124. Between each pair of hinges, the rear cross piece 102 carries a skirt stop 126 which prevents the skirt from swinging downwardly further than with its lower end on the ground, to thereby prevent jamming and to protect the skirts. In the event of the hover running over a rock or other obstacle, only the skirt in line with the obstacle will be moved, thereby minimizing the amount of heat that is lost from under the hover. After passing the obstacle, the skirt will return to the position of FIG. 5 by its own weight. If necessary or desirable, the hinges 124 may be provided with torsion springs to bias the skirts to the closed position.

Means are provided to supply heat under the hover for cultivation. To this end, manifold 92 is mounted on plate 104 in a cut out therein extending between a pair of manifold locating flanges 128. The manifold is held in position by means of a plurality of straps 130 joined to plate 104 or extensions thereof, not shown, by means of hinges 132. The upper ends of the three straps 130 are held on upper front cross piece 106 by means of nut and bolt assemblies 104. Thus, the entire manifold may be rotated about its own axis within straps 130 when the straps are loosened. Rotation of the manifold will effect heat and flame patterns and conditions under the hover, and this versatility of the apparatus of the invention is an important advantage in that it permits use of an optimum angle of incident of the flame on the field, accommodating the different kinds of flames that will be produced by different fuels. Tests have shown that angles in the range of 20° to 30° off vertical towards the rear of the hover are highly satisfactory when using No. 2 fuel oil at about 100 p.s.i., and 30 p.s.i. to 50 p.s.i. primary air on alfalfa.

The manifold 92 proper comprises a length of relatively large diameter thin wall pipe 134, which is closed at both ends. Pipe 134 carries six flame spreaders 136 each joined, as by screws, nuts and bolts, or the like, to a suitably formed opening 138 in pipe 134. Each flame spreader 136 comprises upper and lower walls 140 which converge towards each other moving outwardly from the manifold, and by a pair of side walls 142 which are arcuate and curve towards each other from opening 138 until about the location of the nozzle, and are thereafter flared outwardly away from each other, thus providing a venturi portion, in a horizontal plane, at the vicinity of the nozzle. As is obvious from FIGS. 7 and 8, each flame spreader 136 tends to compress the flame in the vertical direction and spread the flame in the horizontal direction. Tests have shown that the flame spreaders yield advantages in the apparatus of the invention in that they produce a highly uniform distribution of heat across the width of the hover. When the apparatus was tested without the flame spreaders, the results were not as satisfactory.

Means are provided to create a mist of fuel and air and to ignite this mist to create the heat and flame used in cultivation. To this end, a nozzle holder 144 extends between the upper and lower walls 140 of the flame spreader and is joined thereto by any suitable means. Nozzle holder 144 carries a nozzle 146 which is preferably of the type disclosed and claimed in U. S. Pat. No. 3,373,941, by Orvis A. Davis, Sr. one of the coinventors of the present invention, and assigned to the same assignee as the present invention. The nozzle of that patent produces a flat spray which is advantageously utilized in the apparatus of the present invention, because, among other reasons, it can operate with a wide variety of different fuels thus lending further versatility to the apparatus of the invention. A pair of conventional electrical ignitors 148 are provided, and they are held in proper location with respect to the exit end of the nozzle by means of a bracket 150 extending from the vicinity of opening 138 inwardly into the manifold. The ignitors 148 are connected to suitable electric wires 152, one of which is grounded.

Means are provided to supply air under a regulated pressure from line 38 and fuel under pressure from line 26 to each nozzle 146. To this end, an air distribution pipe 154 runs along the outside of the manifold at the side thereof opposite the openings 138. A fuel distributor pipe 156, of smaller diameter than pipe 154, runs substantially coextensively therewith but in closely spaced relation to the manifold pipe 134. Fuel pipes 26 and 156 are joined together by a section of flexible tubing and a quick disconnect coupling, both diagrammatically illustrated in FIG. 6 and designated 158. Similarly, air pipes 38 and 154 are joined together by a length of flexible tubing and a quick disconnect coupling as indicated at 160 in FIG. 6. These two flexible connections facilitate rotation of the manifold pipe, with the flame spreaders thereon, as described above, as well as permitting removal of the entire manifold if such should be desired for servicing, replacement of parts, and the like. As shown in FIG. 7, a fuel delivery pipe 156a runs to each nozzle and nests substantially concentrically within a primary air delivery pipe 154a to each nozzle. The junction to cause this nesting is provided by suitable conventional hardware fittings at the point of entry of the air and oil pipes through the wall of manifold pipe 134.

Means are provided to supply a high volume of low pressure air to the inside of manifold pipe 134 for passage through the flame spreaders 136 to envelope the fuel and primary air mist exiting from the nozzle. Experiments have shown that absent the supply of secondary air combustion will not always occur and at best a very inefficient, high smoke, low heat, flame results, in that the flame tends to "suffocate" under the hover. To this end, manifold pipe 134 is provided with three relatively large diameter sleeves 162 spaced substantially equidistantly along the manifold pipe. An individually adjustable volume of air from the blower, described below in the power group, is supplied to each sleeve 162 via large diameter hoses 164. One wire of each pair of wires 152 is conveniently grounded directly to the manifold, or via one of a pair of bus or distribution wires 166 which extend from the source of electrical energy in the power group described below. Also, one of each pair of wires 152 may be directly and separately connected to the source of electrical energy in the power group described below.

The power group 16 is mounted on a stand 168 of inverted "U" cross section, with the legs welded to the top of the pressure vessel 20. The power group consists of an internal combustion engine 170 having a fuel tank 172, a compressor 174, a blower 176, a fly wheel 178, and a magneto 180. The output shaft of engine 170 is connected by suitable transmission means, such as a plurality of "V" belts 182 to fly wheel 178. For safety purposes, belts 182 are provided with a protective cover 184. Compressor 174, magneto 180, fly wheel 178, and an intermediate pulley or sheave 186 are on a common shaft 188. The drive pulley 190 of blower 176 is joined to pulley 186 by suitable transmission means 192. Magneto 180 is supported outboard of flywheel 178 by a bracket 194 supported on one of the cradles 40. Communication between the outlet side of the compressor and the inside of the pressure vessel is diagrammatically indicated at 196 in FIG. 6, which also includes the no-load starting check valve.

Another advantage of the power train of the power group as shown in the upper portion of FIG. 6 is that the apparatus of the invention may be easily modified for use with a different prime mover. For example, an electric motor and speed reducer set or hydraulic motor could be substituted for internal combustion engine 70, the only modification being, possibly, changing the lengths of the belts or other power transmission means 182.

Blower 176 is of the squirrel cage, high volume, low pressure type, and the outlet plenum of said blower is provided with three individual exit pipes 198. Each pipe 198 is connected to one of the hoses 164 and carries a damper or "butterfly" valve 200, whereby the flow to each portion of the manifold pipe 134 is individually adjustable. Because the secondary air requirement of some of the nozzles is greater than that of others, the provision of adjustment of the secondary air permits creation of uniform flame and heat conditions under the hover. When six similar nozzles are used, the middle ones require more secondary air than the outer ones because the middle ones are "insulated" by the flame to either side of them, and also because the outer ones get some secondary air by leakage under and around the hover. The adjustable secondary air feature is also important when and if it should be desired to use sets of different capacity nozzles. This might be desirable, for example, with crops other than alfalfa where the heat requirements may be different.

While the invention has been described in detail above, it is to be understood that this detailed description is by way of example only, and the protection granted is to be limited only within the spirit of the invention and the scope of the following claims.

We claim:

1. In combination, a manifold assembly, a nozzle carried by said manifold assembly, means to supply pressurized primary air and pressurized fuel to said nozzle from said manifold assembly, means to supply secondary air through said manifold assembly around the outside of said nozzle, an energy source, and means to connect said energy source in driving relation to said pressurized primary air supply means, said pressurized fuel supply means, and said secondary air supply means.

2. The combination of claim 1, support means, a hover assembly carried by said support means and carrying said manifold assembly, whereby the flame issuing from said nozzle is contained under said hover to create a relatively small region of relatively high temperature.

3. The combination of claim 2, said nozzle comprising a flat spray nozzle, and flame spreader means extending from said manifold around said nozzle and adapted to further horizontally flatten the flame issuing from the nozzle.

4. The combination of claim 1, electrical ignition means in operative relation with the exit end of said nozzle, means to supply electrical energy to said ignition means, and means to connect said electrical energy supply means in driving relation to said energy source.

5. The combination of claim 4, said electrical energy supply means comprising electrical wires running from a source of electrical energy to the vicinity of said nozzle, and means to run said wires through said manifold assembly.

6. The combination of claim 4, said energy source comprising an internal combustion engine, said electrical supply means comprising a magneto, said primary air supply means comprising an air compressor, said second air supply means comprising a blower, a shaft interconnecting the input shaft of said magneto and said compressor, a flywheel on said connecting shaft, a pulley on said connecting shaft, means to transmit power from the output of said internal combustion engine to said flywheel, and means to transmit power from said pulley to said blower.

7. The combination of claim 1, said means to supply pressurized primary air and pressurized fuel to said nozzle comprising a pressure vessel having a volume of fuel therein less than the volume of said pressure vessel and an air compressor adapted to supply pressurized air to the space in said pressure vessel above the level of said fuel therein, conduit means at the upper portion of said pressure vessel to supply pressurized primary air to said nozzle and conduit means at the lower portion of said pressure vessel to supply said pressurized fuel to said nozzle.

8. The combination of claim 7, means to mount said air compressor on the pressure vessel with the output side of said compressor in communication with the space in the upper portion of said pressure vessel above the fuel in said pressure vessel.

9. The combination of claim 7, said pressure vessel being of generally cylindrical configuration with its longitudinal axis disposed generally horizontally, an opening formed in an end portion of said pressure vessel, said pressurized air conduit means comprising a snorkel tube extending from said opening into said pressure vessel and terminating at a location in closely spaced relation to the highest portion of said pressure vessel, whereby the possibility of fuel being drawn into said air conduit means as said pressure vessel is moved is substantially eliminated.

10. The combination of claim 2, said hover assembly comprising a leading end and a trailing end, means to mount said manifold assembly at the leading end of said hover, a plurality of hingedly mounted skirts comprising the trailing end of said hover, whereby when said hover passes over an obstacle only a skirt directly in line with the obstacle is moved to thereby minimize the heat loss caused by opening of the trailing end of said hover.

11. The combination of claim 3, said hover assembly comprising a leading end and a trailing end, means to mount said manifold assembly at the leading end of said hover, said manifold assembly comprising a length of relatively large diameter thin wall pipe having its axis disposed perpendicular to the normal direction of travel of said hover, said manifold mounting means comprising a plurality of hingedly mounted straps joined to said hover and substantially encircling said manifold pipe, a plurality of said nozzles and a plurality of said flame spreader means, whereby said manifold pipe may be rotated about the axis of said pipe within said straps to change the angle of impingement of the flames issuing from said nozzles and flame spreaders with respect to the ground under said hover.

12. The combination of claim 2, said secondary air supply means comprising a blower, said hover assembly comprising a leading end and a trailing end, said manifold assembly comprising an elongated manifold pipe mounted on the leading end of said hover with its axis disposed generally perpendicular to the normal direction of travel of said hover, a plurality of hoses extending from the air outlet of said blower to various locations along said manifold pipes and means to individually adjust the amount of air flowing through each of said hoses.

13. The combination of claim 2, a hydraulic cylinder mounted on said support means and adapted to lift said hover assembly up off of the ground with respect to said support means, said support means comprising means to connect said support means to a vehicle for moving the combination, and means to connect said hydraulic cylinder to said vehicle for operation of said cylinder by the hydraulic system of said vehicle.

14. The combination of claim 2, said hover assembly comprising a leading end and a trailing end, said manifold assembly comprising an elongated manifold pipe disposed on the leading end of said hover perpendicular to the normal direction of travel of said hover, said primary air supply means and said fuel supply means each including a distribution pipe running generally parallel to said manifold pipe, a plurality of said nozzles in said manifold assembly, a primary air delivery pipe and a fuel delivery pipe running from each of said primary air and fuel distribution pipes to each of said nozzles, but each pair of primary air and fuel delivery pipes to each nozzle being nested within each other.

15. The combination of claim 14, said fuel delivery pipe being nested within said primary air delivery pipe.

16. In combination, a manifold assembly, a nozzle carried by said manifold assembly, means to supply pressurized primary air and pressurized fuel to said nozzle from said manifold assembly, means to supply secondary air though said manifold assembly around the outside of said nozzle, an energy source; means to connect said energy source in driving relation to said pressurized primary air supply means, said pressurized fuel supply means, and said secondary air supply means; electrical ignition means in operative relation with the exit end of said nozzle, means to supply electrical energy to said ignition means, means to connect said electrical energy supply means in driving relation to said energy source, and said electrical energy supply means comprising electrical wires running from a source of electrical energy to the vicinity of said nozzle.